United States Patent [19]

Shimada

[11] Patent Number: 4,851,070
[45] Date of Patent: Jul. 25, 1989

[54] METHOD OF FORMING AN AUTOMOTIVE SEAT HAVING A COVER INSERTED IN A LATERAL GROOVE

[75] Inventor: Makoto Shimada, Akishima, Japan
[73] Assignee: Tachi-S Company, Ltd., Tokyo, Japan
[21] Appl. No.: 125,457
[22] Filed: Nov. 25, 1987
[51] Int. Cl.⁴ .......................... B32B 31/20; B32B 3/04
[52] U.S. Cl. ..................................... 156/293; 156/212; 156/214; 156/216; 156/303.1; 264/321
[58] Field of Search ................. 297/DIG. 1, 461, 452; 156/211–214, 216, 245, 232, 293, 303.1; 264/321; 425/DIG. 29

[56] References Cited

U.S. PATENT DOCUMENTS

| | | | |
|---|---|---|---|
| 3,325,329 | 6/1967 | Bolesky | 156/216 |
| 3,629,033 | 12/1971 | Carter | 156/216 X |
| 4,403,357 | 9/1983 | Urai | 297/DIG. 1 X |
| 4,541,885 | 9/1985 | Caudill, Jr. | 156/245 X |

FOREIGN PATENT DOCUMENTS 57-46838  3/1982  Japan .................................. 156/213

Primary Examiner—Michael W. Ball
Assistant Examiner—Jeff H. Aftergut
Attorney, Agent, or Firm—Browdy & Neimark

[57] ABSTRACT

A method of forming an automotive seat, which basically comprises the steps of bonding a covering member to the upper surface of a foam cushion body, applying a pressure to a part of the lateral wall of the cushion body together with the corresponding part of the covering member, using a horizontally pressing means, so that the pressurized part of the covering member is inserted into and bonded in the lateral wall of the cushion body. In this way, a decorative deep groove is formed at the lateral portions of the seat.

18 Claims, 2 Drawing Sheets (b)

METHOD OF FORMING AN AUTOMOTIVE SEAT HAVING A COVER INSERTED IN A LATERAL GROOVE

BACKGROUND OF THE INVENTION

1. Field of the invention

The present invention relates to a method of forming an automotive seat, and in particular relates to a method of forming a deep groove in the lateral surfaces of the seat during the forming process in which a covering member is directly bonded to a cushion body made of such material as urethane foam.

2. Description of the Prior Art

Reference is made to FIG. 1, which illustrates a conventional seat construction comprising a cushion body (101) made of such material as urethane foam or the like and formed by a mold in a predetermined shape, and a covering member (102) directly bonded to the cushion body (101) in an integral manner.

To form such integral seat body, a common method hitherto basically involved vertically pressing steps using a pressure die in order to bond a unitary sheet of the covering member (102) to the cushion body (101), while at the same time forming the desired shape of seat.

However, difficulty exists when the prior art method is utilized for forming the above-mentioned seat whose cushion body (101) includes lateral walls (103) which are tapered downwardly, because the vertically pressing steps are limited to the vertically directed bonding. They are not suited for bonding a lateral side portion (102b) of the covering member (102) to the corresponding lateral walls (103) of the cushion body (101).

Further, entirely bonding the covering member (102) to all outer surface areas of the cushion body (101), including their respective lateral portions, deteriorates the elastic cushioning effect of the seat.

Another drawback in the above-mentioned prior art method is that the lateral side portion (102b) of the covering member (102) lies loosely away from the cushion body (101), as in the phantom line of FIG. 1. After the seat is assembled, the portion (102b) is merely secured at its lower part to the seat and will be distorted into a slack state when an occupant sits on the seat, which consequently impairs the aesthetic appearance of the seat. In addition, the resultant seat has no attractive characteristics for commercial value, because of its simple arrangement of the cushion body (101) and the covering member (102) being merely mounted on a seat cushion frame (104), as understandable from the FIG. 1.

SUMMARY OF THE INVENTION

With the above-stated drawbacks in view, it is accordingly a primary purpose of the present invention to provide an improved method of forming an automotive seat, which allows the formation of a highly aesthetically pleasing seat with a simulated two-layer cushion appearance.

To attain the above purpose, in accordance with the present invention, there are involved the following steps:

(a) in the course of bonding a covering member to a cushion body, the lateral side portions of the covering member are part-way forcibly inserted into the lateral walls of the cushion body, by use of a horizontally movable pressing means; and, (b) then, the covering member is pressed and bonded to the cushion body vertically and horizontally, to thereby form an automotive seat.

In this way, a decorative deep groove is formed in the lateral portions of the seat, and therefore the groove serves to give such an appearance as if the seat were divided into two sections and thus two cushion bodies were laminated together, which simulates a two-layer cushion structure, providing a highly aesthetically pleasing effect to the whole appearance of seat.

By the use of the horizontally pressing means, movable the lateral side portions of the covering member can easily be bonded to the corresponding lateral walls of the cushion body, with decorative deep grooves being formed therein at the same time.

It is a second purpose of the present invention to facilitate the ease with which the lateral side portions of the covering member are positively bonded to the lateral walls of the cushion body.

In accomplishing this purpose, the present invention includes the step of vertically pressing and bonding the covering member to the cushion body, using a vertically directed pressing means, simultaneously with the above-mentioned directed pressing and bonding process. That is, the central seating portion of the covering member is pressed against the upper surface of the cushion body by the vertically directed pressing means, during the horizontally directed bonding process in which the lateral side portions of the covering member are pressed and bonded to the lateral walls of the cushion body. Thus the covering member is retained in its central portion, preventing the dislocation of the whole covering member relative to the cushion body, as well as allowing easy and positive bonding of the lateral side portions of the former to the lateral walls of the latter.

In one aspect of the present invention, the two-layer cushion structure for the improved seating structure is created by adopting the steps of bonding a sub pad made of a slab material to a main pad foamed in a mold, to thereby define a deep groove along the boundary between the sub and main pads, and then inserting the lateral side portion of the covering member part-way into such groove through the aforementioned pressure bonding steps. Accordingly, in this respect a clear-cut simulation of two-layer cushion apperance is not only achieved, but the seating comfort is also greatly improved.

DETAILED DESCRIPTION OF PREFERRED EMBODIMENTS OF THE INVENTION

Figure 3:
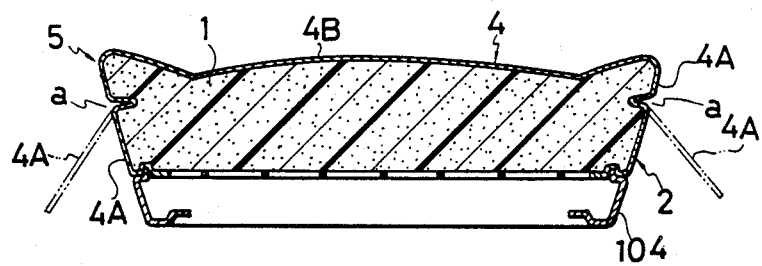
FIG. 3 is a sectional view taken along the line III—III in the FIG. 2.
Figure 2:
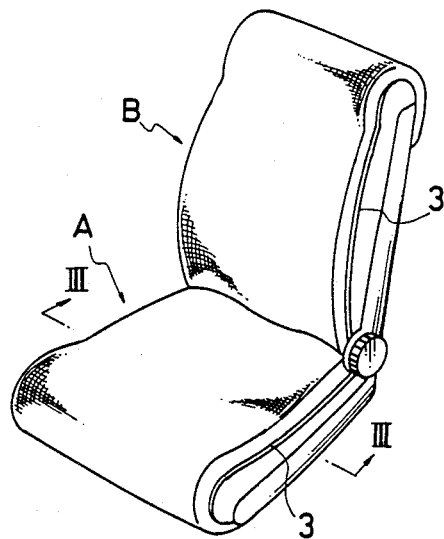
FIG. 2 is a perspective view of an automotive seat formed in accordance with the present invention method.

Referring to FIGS. 2 and 3, there is respectively illustrative a resultant seat formed by the present invention method.

Figure 1:
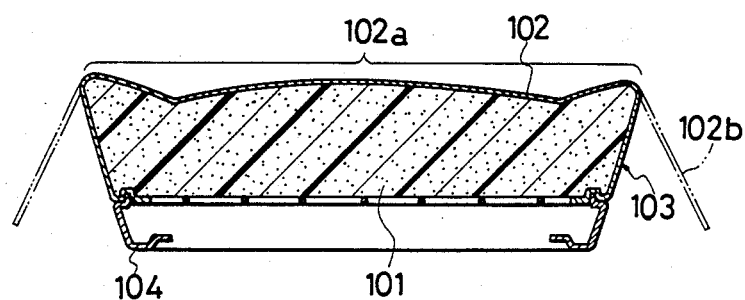
FIG. 1 is a cross-sectional view of a seat structure formed by a conventional forming method.

As shown in FIG. 3, a central seating portion (4B) of a covering member (4) is bonded to the upper surface of a cushion body (1), and lateral side portions (4A) of the covering member (4) are partway recessed at the respective V-shaped deep grooves (3) defined in the lateral walls of the cushion body (1). It is to be appreciated therefore that the grooves (3) and the corresponding part of the covering member (4) serve to simulate such appearance that a separate small cushion member is placed upon the cushion body (1), providing a luxury seat construction. It is also important to note that the non-bonded lateral side portions (4A) disposed below the grooves (3) are relatively shorter, as compared with those (102b) of the conventional seat shown in FIG. 1, and as such, the portions (4A) will not be so deformed into a slacked state.

To form the above-mentioned seat of FIG. 2, firstly, a vertically movable pressing means to be described later is employed to press and bond the central seating portion (4B) to the upper surface of the cushion body (1) in a vertical direction, and a horizontally movable pressing means (9) (see FIG. 4) is also utilized to press and bond the lateral side portions (4A) to the lateral walls of the cushion body (1) so that V-shaped deep grooves are formed therein.

Figure 6:
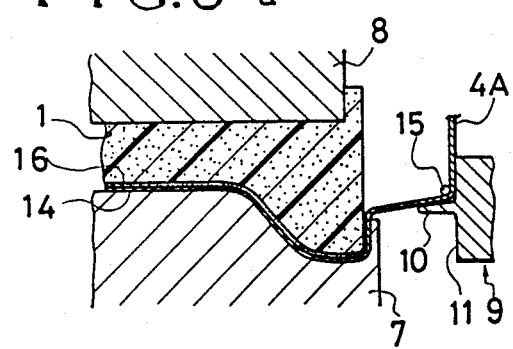
FIG. 6(a) is a partial sectional view of the third embodiment which explanatorily shows the state prior to the bonding of the lateral side portion of of a covering member.
FIG. 6(b) is a partial sectional view of the same third embodiment which explanatorily shows the state in which the lateral side portion of the covering member is pressed and bonded to the lateral wall of the cushion body, with a deep groove being formed therein.
Figure 6:
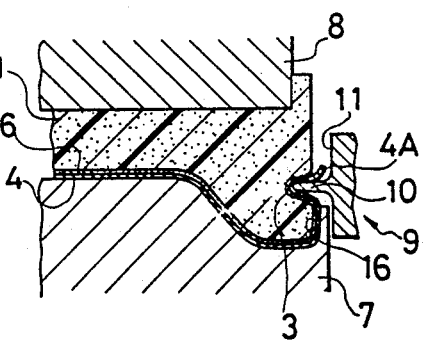

The vertically movable pressing means may be of any conventional structure, comprising an upper die (not shown, but see the lower die (7) in FIG. 6 whose reversed configuration corresponds to the shape of the upper die in question) having a working surface conforming to the upper contour of the cushion body (1), a lower die (7) (as in FIG. 4), and a hydraulic cylinder (not shown), such that one of those upper and lower dies is vertically movable by operation the hydraulic cylinder, while the other of them is fixed stationary.

Figure 4:
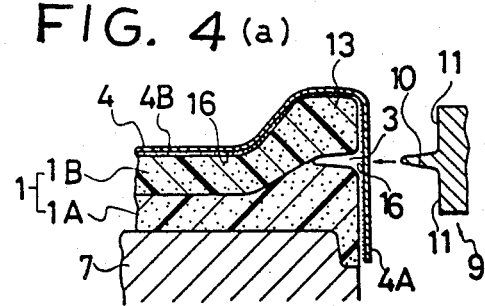
FIG. 4(a) is a partial sectional view of the first embodiment of the present invention method which explanatorily shows the state prior to the bonding of the lateral side portion of a covering member.
FIG. 4(b) is a partial sectional view of the first embodiment of the same which explanatorily shows the state in which the lateral side portion of the covering member is pressed and bonded to the lateral wall of with cushion body, and a deep groove being formed therein.

As shown in FIG. 4, the horizontally movable pressing means (9) comprises a horizontally projected protrusion (10) and a vertically extending shoulder portions (11). The length of the protrusion (10) is substantially equal to the entire length of the lateral wall of the cushion body (1), and the shoulder portions (11) are adapted to abut against the lateral wall of the cushion body (1).

The horizontally movable pressing means (9) includes a hydraulic cylinder (not shown) adapted to move the means toward and away from the lateral wall of the cushion body (1) in a horizontal line.

Both the vertically directed pressing means and the horizontally directed pressing means (9) are not limited to the illustrated embodiments but may include any other suitable means and mechanisms, and may be modified in various ways.

Figure 4A:
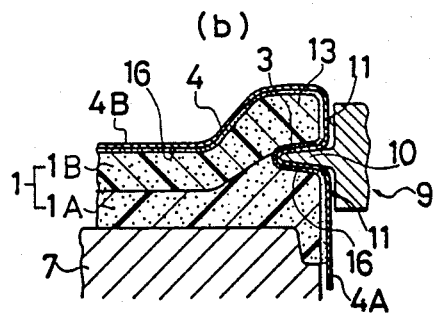

Referring now to FIGS. 4(a) and 4(b), there is illustrated the first embodiment of the present invention, in which the cushion body (1) comprises a foam main pad (1A) formed in a mold and a sub pad (1B) made of a slab material which is bonded to the upper surface of the main pad (1A).

In such first illustrated embodiment, at first the sub pad (1B) is pressed and bonded to the upper surface of the main pad (1A) so as to form the cushion body (1) such that a recessed groove (3) is defined in the boundary between main and sub pads (1A)(1B). Then, the cushion body (1) is placed on the lower die (7) of the vertically directed pressing means, and the covering member (4) is laminated on the upper surface of the cushion body (1), with an adhesive being applied to either the surface of the cushion body (1) or the back surface of the covering member (4). Thereafter, the foregoing upper die of the vertically directed pressing means, whose working surface is identical in shape to the outer contour of the sub pad (1B), is lowered and pressed against the lamination of the covering member (4) and cushion body (1) such that the central seating portion (4B) of the covering member (4) is pressed and bonded to the sub pad (1b) along the surface of the latter.

Next, the upper die is slightly raised to lower its pressure to such a degree in which the cushion body (1) elastically recovers to its original shape, and thereafter, by operating the horizontally movable pressing means (9), its protrusion (10) is brought to insertion into the recessed groove (3) of the cushion body (1) so that the corresponding part of the covering member (4), being forcibly pressed by the protrusion (10), is bonded within the recessed groove (3). Simultaneously with this process, the shoulder portions (11) of the horizontally movable pressing means (9) are brought to abutment against the lateral side portion (4A) of the covering member (4), pressing the same, except for the area corresponding to the recessed groove (3), as shown in FIG. 4(b), with the result that the lateral side portion (4A) is bonded to both recessed groove (3) and adjacent lateral wall of the cushion body, (1). After raising the upper die, a seat is provided in which the covering member (4) is fully bonded to the outwardly exposed surfaces of the cushion body (1).

In this respect, the embodiment shown in FIG. 4 has no depiction that the upper die of the vertically pressing means is positioned in contact with the lamination of the covering member (4) and the cushion body (1). But, the upper die may be raised away from that lamination, if it is preferred.

While in this embodiment the recessed groove (3) is previously formed in advance of the pressure bonding process, it should be understood that the groove (3) may be formed by merely operating the horizontally pressing means (9) to press its protrusion (10) into the non-recessed boundary between the main and sub pads (1A)(1B) while simultaneously pressing a part of the lateral side portion (4A) thereinto.

Figure 5:
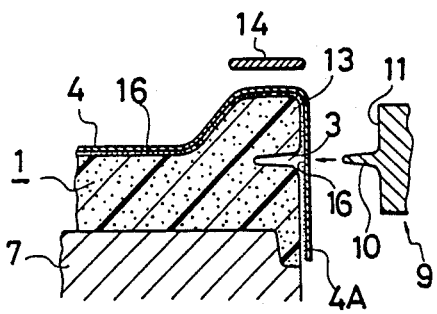
FIG. 5 is a partial sectional view of the second embodiment.

Referring next to FIG. 5, illustrated is a second embodiment of the present invention. According to this embodiment, all the steps are similar to those described in the above-stated first embodiment, except that, instead of the upper die, a pressing plate (14) is employed to pressingly retain the peripheral raised portion (13) of the cushion body (1) as well as the corresponding parts of the covering member (4) thereon, so that the recessed groove (3) retains its shape to facilitate the positive insertion thereinto of the protrusion (10) and the corresponding part of the covering member (4). Consequently, such corresponding part of the covering member (4) is evenly and positively bonded to the groove (3), when inserted into the same by the protrusion (10). It is to be appreciated here as well that the combination of the pressing plate (14) and horizontally movable pressing means (9) serves to press the covering member (4) against the peripheral raised portions (13) as well as entire lateral walls of the cushion body (1), without any clearance caused therebetween, to thereby permit uniform bonding of the covering member (4) to the peripheral raised portion (13), recessed groove (3) and lateral wall of the cushion body (1) in all.

Accordingly, in actual operation, after the vertically directed pressing means is actuated to raise the upper die thereof from the cushion body (1) that has undergone the foregoing pressure bonding process, the pressing plate (14) is caused by a suitable mechanism to move downwardly and abut against the top surface of peripheral raised portion (13), and then, the horizontally directed pressing means (9) is operated so that it is pressed against the lateral wall of the cushion body (1), with its protrusion (10) and the corresponding part of the covering member (4) being inserted into the recessed groove (3).

FIGS. 6(A) and 6(B) show the third embodiment of the present invention, in which the recessed groove (3) is formed in the lateral wall of the cushion body (1) simultaneously with the bonding of a covering member (14) to the cushion body (1). In this embodiment, a part of the lateral side portion (4A) of covering member (14) is directly pressed into the plane lateral wall of the cushion body (1). The forming steps are such that, firstly, the inside-out turned covering member (14) is placed upon a lower die (7) having a working surface identical in shape to the upper contour of the cushion body (1). Then, an adhesive (16) is applied to either the covering member (14) or the cushion body (2), and thereafter the cushion body (1) is placed on the covering member (14). Then, the end portion of the covering member (14) is retained securely on the foot portion of a protrusion (10) adjacent to shoulder portions (11), of a horizontally pressing means (9), by means of a clamp (15). Next, an upper die (8) is lowered and pressed against the rear surface of the cushion body (1) so that the covering member (14) is bonded to the cushion body (1). During this pressure bonding process, the upper die (8) is kept at the lowered position while simultaneously a horizontally directed pressing means (3) is operated in order that its protrusion (10) and the corresponding part of the lateral side portion (4A) of the covering member (14) are pressed into the lateral wall of the cushion body (1). As a result, the recessed groove (3) is formed within the cushion body (1) and at the same time the lateral side portion (4A) is part-way inserted and bonded in the recessed groove (3).

In this third illustrated embodiment, both vertically and horizontally directed pressing means described are constructed in a similar manner as in the above-discussed first embodiment, except that the lower die (7) has a working surface of a corresponding configuration to the upper contour of the cushion body (1), and clamp (15) is provided at the horizontally pressing means (9).

From the above description, it is seen that, in accordance with the present invention, when the covering member is pressed and bonded to the cushion body, the horizontally directed pressing means employed is actuated to press its protrusion and the corresponding part of the lateral side portion of the covering member into the lateral wall of the cushion body, whereupon the simultaneous procedure for forming a decorative deep groove in and bonding the covering member to the cushion body is effectively made. Additionally, can be executed the simultaneous bonding of the upper seating portion and lateral side portion of the covering member to the cushion body can be executed. Hence, it is effectively possible to produce an automotive seat with a simulated twolayer cushion appearance in a simple manner.

The above description has been given of preferred embodiments of the present invention, but the invention is not limited to the embodiments shown, but various modifications and additions may be possible without departing from the scope and spirit of the appended claims.

What is claimed is:

1. A method of forming an automotive seat, comprising the steps of:
   bonding a first portion of a covering member to an upper surface of a foam cushion body;
   applying pressure to a part of a lateral wall of said cushion body, together with a part of a second portion of said covering member, using a horizontally directed pressing means having a protrusion extending generally perpendicular to said lateral wall to insert and adhesively bond said part of said covering member into a deep groove in the lateral wall of said cushion body; and
   removing the resultant seat;
   wherein said cushion body comprises a main pad formed in a mold and a sub pad made of a slab material, the sub pad being bonded to an upper surface of said main pad, and wherein said groove is previously formed, using said horizontally directed pressing means, along a boundary.

2. The method as defined in claim 1, wherein it includes the steps of applying an adhesive to an upper surface of said cushion body, pressing said covering member against said upper surface of said cushion body in a vertical direction so that said covering member is bonded to said upper surface of said cushion body, thereafter lowering a pressure degree, and effecting said inserting and bonding of said part of said covering member in said lateral wall of said cushion body while said lowered pressure is applied.

3. The method as defined in claim 1, wherein said horizontally pressing means further includes, shoulder portions surrounding said protrusion, and a hydraulic cylinder, such that said protrusion and shoulder portions are provided forwardly of said hydraulic cylinder.

4. The method as defined in claim 1, wherein said cushion body is made of urethane foam and formed in a mold into a predetermined outer contour of the seat.

5. The method as defined in claim 1, wherein said bonding of said first portion of said covering member to said upper surface of said foam cushion body is carried out in a vertically directed pressing means comprising an upper die and a lower die.

6. A method of forming an automotive seat, comprising the steps of:
   bonding a first portion of a covering member to an upper surface of a foam cushion body;
   applying pressure to a part of a lateral wall of said cushion body, together with a part of a second portion of said covering member, using a horizontally directed pressing means having a protrusion extending generally perpendicular to said lateral wall to insert and adhesively bond said part of said covering member into a deep groove in the lateral wall of said cushion body; and removing the resultant seat;

further comprising the step of applying pressure to a peripheral portion of said cushion body in a vertical direction, during the steps of inserting said part of said covering member into the lateral wall of said cushion body in a horizontal direction, using said horizontally directed pressing means, whereby said part of said covering member is positively bonded in said lateral wall of said cushion body.

7. The method defined in claim 6, wherein said cushion body is made of urethane foam and formed in a mold into a predetermined outer contour of the seat.

8. The method as defined in claim 6, wherein said bonding of said first portion of said covering member to said upper surface of said foam cushion body is carried out in a vertically directed pressing means comprising an upper die and a lower die.

9. The method as defined in claim 6, wherein it includes the steps of applying an adhesive to an upper surface of said cushion body, pressing said covering member against said upper surface of said cushion body in a vertical direction so that said covering member is bonded to said upper surface of said cushion body, thereafter lowering a pressure degree, and effecting said inserting and bonding of said part of said covering member in said lateral wall of said cushion body while said lowered pressure is applied.

10. The method as defined in claim 6, wherein said horizontally directed pressing means further includes shoulder portions surrounding said protrusion, and a hydraulic cylinder, such that said protrusion and shoulder portions are provided forwardly of said hydraulic cylinder.

11. The method as defined in claim 6, wherein said deep groove is preformed, and further comprising bonding a third peripheral portion of said covering member to a part of said lateral wall of said foam cushion body lying below said groove.

12. A method of forming an automotive seat, comprising the steps of:

pre-forming a groove in a lateral wall of a foam cushion body;

pressing and bonding a first portion of a covering member to an upper surface of said foam cushion body, using a vertically directed pressing means;

inserting and adhesively bonding a part of a second portion of said covering member into said groove formed in said lateral wall of said foam cushion body using a horizontally directed pressing means having a protrusion generally complementary to the shape of said preformed groove while holding said lateral wall stationary;

bonding a third peripheral portion of said covering member to a part of said lateral wall of said foam cushion body lying below said groove; and removing the resultant seat.

13. The method as defined in claim 2, wherein said cushion body is made of urethane foam and formed in a mold into a predetermined outer contour of the seat.

14. The method as defined in claim 12, wherein said cushion body comprises a main pad formed in a mold and a sub pad made of a slab material, the sub pad being bonded to an upper surface of said main pad, and wherein said groove is preformed in a boundary between said main and sub pads.

15. The method as defined in claim 12, wherein said vertically directed pressing means comprises an upper die and a lower die.

16. The method as defined in claim 12, wherein it includes the steps of applying an adhesive to an upper surface of said cushion body, pressing said covering member against said upper surface of said cushion body in a vertical direction so that said covering member is bonded to said upper surface of said cushion body, thereafter lowering a pressure degree, and carrying out said inserting and bonding said part of said second portion of said covering member into said groove in said lateral wall of said cushion body while said lowered pressure is applied.

17. The method as defined in claim 12, wherein it includes the steps of applying an adhesive to an upper surface of said cushion body, pressing said covering member against said upper surface of said cushion body in a vertical direction so that said covering member is bonded to said upper surface of said cushion body, thereafter lowering a pressure degree, and effecting said inserting and bonding of said part of said covering member in said lateral wall of said cushion body while said lowered pressure is applied.

18. The method as defined in claim 12, wherein said horizontally directed pressing means further includes shoulder portions surrounding said protrusion, and a hydraulic cylinder, such that said protrusion and shoulder portions are provided forwardly of said hydraulic cylinder.

* * * * *